(12) United States Patent
Gommé et al.

(10) Patent No.: US 12,199,696 B2
(45) Date of Patent: Jan. 14, 2025

(54) NEAR-FIELD WIRELESS DEVICE (71) Applicant: NXP B.V., Eindhoven (NL)

(72) Inventors: Liesbeth Gommé, Anderlecht (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 7 days.

(21) Appl. No.: 17/339,022

(22) Filed: Jun. 4, 2021

(65) Prior Publication Data
US 2022/0393722 A1 Dec. 8, 2022

(51) Int. Cl.
| | |
|---|---|
| *H04L 27/00* | (2006.01) |
| *H04B 5/72* | (2024.01) |
| *H04B 17/318* | (2015.01) |
| *H04L 27/32* | (2006.01) |
| *H04W 76/14* | (2018.01) |

(52) U.S. Cl.
CPC ............. *H04B 5/72* (2024.01); *H04B 17/318* (2015.01); *H04L 27/32* (2013.01); *H04W 76/14* (2018.02)

(58) Field of Classification Search
CPC ..... H04B 5/0031; H04B 17/318; H04L 27/32; H04L 1/0003; H04L 27/00; H04W 76/14
See application file for complete search history.

(56) References Cited

U.S. PATENT DOCUMENTS

| | | | |
|---|---|---|---|
| 7,190,937 B1 | 3/2007 | Sullivan et al. | |
| 8,755,269 B2 | 6/2014 | Jollota | |
| 8,886,055 B1* | 11/2014 | Morero | H04L 1/0045 398/208 |
| 9,619,010 B1 | 4/2017 | Marathe et al. | |
| 9,668,212 B2 | 5/2017 | Lee et al. | |
| 10,944,447 B1 | 3/2021 | Kerselaers et al. | |
| 11,263,919 B2* | 3/2022 | Malhotra | A63B 69/36 |
| 2005/0032514 A1* | 2/2005 | Sadri | H04W 52/346 455/67.11 |
| 2007/0147170 A1* | 6/2007 | Hood | A61M 5/172 366/127 |
| 2009/0296852 A1* | 12/2009 | Kobayashi | H04L 1/0003 375/295 |
| 2011/0110284 A1* | 5/2011 | Wu | H04L 1/0001 370/312 |

(Continued)

FOREIGN PATENT DOCUMENTS

| | | |
|---|---|---|
| EP | 3273609 A1 | 1/2018 |
| WO | WO-2021007555 A1 | 1/2021 |

OTHER PUBLICATIONS

U.S. Appl. No. 17/206,061; 50 pages (Mar. 18, 2021).

(Continued)

*Primary Examiner* — Cindy Trandai (57) ABSTRACT

One example discloses a first near-field device, including: a controller configured to establish a near-field communications link with a second near-field device; wherein the controller is configured to monitor a characteristic of the near-field communications link; wherein the controller is configured to select a first modulation encoding for transmitting a near-field signal if the characteristic is greater than a first characteristic threshold; and wherein the controller is configured to select a second modulation encoding for transmitting the near-field signal if the characteristic is less than the first characteristic threshold but greater than a second characteristic threshold.

22 Claims, 5 Drawing Sheets

(56) References Cited

U.S. PATENT DOCUMENTS

| | | | |
|---|---|---|---|
| 2011/0165862 A1* | 7/2011 | Yu | H04M 1/72412 |
| | | | 455/411 |
| 2012/0099607 A1* | 4/2012 | Cariou | H04L 27/261 |
| | | | 375/316 |
| 2013/0077659 A1* | 3/2013 | Okuda | H04J 3/0667 |
| | | | 375/219 |
| 2013/0209091 A1* | 8/2013 | Mateosky | H04B 10/516 |
| | | | 398/25 |
| 2013/0281016 A1 | 10/2013 | McFarthing | |
| 2014/0078921 A1* | 3/2014 | Jeong | H04L 1/0003 |
| | | | 370/252 |
| 2014/0080409 A1* | 3/2014 | Frankland | H02J 7/00034 |
| | | | 455/41.1 |
| 2015/0063827 A1* | 3/2015 | Daunt | H04B 10/5561 |
| | | | 398/188 |
| 2015/0155972 A1* | 6/2015 | Umeda | H04L 1/005 |
| | | | 375/341 |
| 2015/0327185 A1* | 11/2015 | Morioka | H04W 52/143 |
| | | | 370/336 |
| 2016/0182203 A1* | 6/2016 | Fang | H04L 5/0048 |
| | | | 370/329 |
| 2016/0338059 A1* | 11/2016 | Huang | H04W 72/02 |
| 2017/0195964 A1* | 7/2017 | Smaini | H04W 52/0235 |
| 2017/0273092 A1* | 9/2017 | Nabetani | H04B 7/0452 |
| 2018/0015327 A1 | 1/2018 | Lee et al. | |
| 2019/0028230 A1* | 1/2019 | Dabbagh | H04B 7/0413 |
| 2019/0081727 A1* | 3/2019 | Feng | H04L 1/203 |
| 2019/0089571 A1* | 3/2019 | Von Novak, III | H04L 1/0003 |
| 2019/0174239 A1 | 6/2019 | Niklaus et al. | |
| 2019/0246350 A1 | 8/2019 | Stein et al. | |
| 2019/0252919 A1 | 8/2019 | Ogawa et al. | |
| 2019/0289481 A1* | 9/2019 | Qvarfordt | H04W 24/08 |
| 2020/0229206 A1* | 7/2020 | Badic | H04W 40/24 |
| 2021/0060244 A1* | 3/2021 | Bazargan | A61M 5/14244 |
| 2022/0226695 A1* | 7/2022 | Madonna | A61B 5/11 |
| 2022/0304580 A1* | 9/2022 | Bhowmik | A61B 5/02141 |

OTHER PUBLICATIONS

Wikipedia; "Carrier-sense multiple access"; retrieved from the Internet https://en.wikipedia.org/wiki/Carrier-sense_multiple_access; 3 pages (Jun. 1, 2021).

Wikipedia; "Frequency-hopping spread spectrum"; retrieved from the Internet https://en.wikipedia.org/wiki/Frequency-hopping_spread_spectrum; 5 pages (Jun. 1, 2021).

Wikipedia; "Time-division multiple access"; retrieved from the Internet https://en.wikipedia.org/wiki/Time-division_multiple_access; 4 pages (Jun. 1, 2021).

U.S. Appl. No. 17/206,061; Notice of Allowance Dec. 8, 2022; 10 pages.

U.S. Appl. No. 17/206,061; Final Rejection Office Action Sep. 6, 2022; 17 pages.

U.S. Appl. No. 17/206,061; Non-Final Office Action Mar. 31, 2022; 20 pages.

Prabh, K. Shashi et al.; "Opportunistic Packet Scheduling in Body Area Networks"; 8th European Conference on Wireless Sensor Networks, Bonn, Germany; 16 pages (Feb. 2011). Reference was previously uploaded on Jun. 4, 2021.

* cited by examiner

NEAR-FIELD WIRELESS DEVICE

The present specification relates to systems, methods, apparatuses, devices, articles of manufacture and instructions for near-field communications.

SUMMARY

According to an example embodiment, a first near-field device, comprising: a controller configured to establish a near-field communications link with a second near-field device; wherein the controller is configured to monitor a characteristic of the near-field communications link; wherein the controller is configured to select a first modulation encoding for transmitting a near-field signal if the characteristic is greater than a first characteristic threshold; and wherein the controller is configured to select a second modulation encoding for transmitting the near-field signal if the characteristic is less than the first characteristic threshold but greater than a second characteristic threshold.

In another example embodiment, the controller is configured to delay transmission of the near-field signal to the second near-field device if the characteristic is below both the first and second modulation encodings.

In another example embodiment, the first modulation encoding has a greater number modulation-states than the second modulation encoding.

In another example embodiment, both the first and second characteristic thresholds correspond to a packet error rate (PER) less than a single PER threshold.

In another example embodiment, the controller is configured, to transmit a first part of the near-field signal using the first modulation encoding when the characteristic is greater than the first characteristic threshold; to transmit a second part of the near-field signal using the second modulation encoding when the characteristic is less than the first characteristic threshold; and to delay transmission of a third part of the near-field signal when the characteristic is lower than both the first and second characteristic thresholds.

In another example embodiment, the first modulation encoding has a greater maximum theoretical data-rate than the second modulation encoding.

In another example embodiment, the modulation encoding is a modulation order having two or more modulation-states.

In another example embodiment, the controller is configured to incrementally increase the modulation order as the characteristic increases, and incrementally decrease the modulation order as the characteristic decreases.

In another example embodiment, the modulation encoding is at least one of: BSK, BPSK, DPSK, or QPSK.

In another example embodiment, in response to preparing a set of data packets according to a quality of service, the controller is configured to select a set of modulation orders such that the second device would receive the set of data packets as required by the quality of service.

In another example embodiment, the controller is configured to reduce power consumption of the device if the characteristic is less than both the first and second characteristic thresholds.

In another example embodiment, the controller is configured to define a transmission window as a time period when the characteristic is above either one of the characteristic thresholds; the controller is configured to extract a set of features from the near-field communications link characteristic within the transmission window; at least one of the features is a trigger feature found at a beginning of the transmission window; and the controller is configured to logically equate the trigger feature with a beginning of a specific user movement.

In another example embodiment, the specific user movement is at least one of: walking, moving arms, moving head, moving fingers, bending, stretching, jumping, swimming, rotating, swinging, holding a posture, meditating, or moving in relation to another user.

In another example embodiment, the controller is configured to instruct the user to perform the specific user movement; and to verify that the specific user movement has been performed by monitoring the characteristic for the trigger feature.

In another example embodiment, the characteristic of the near-field communications link is a received signal strength (RSS) from a second near-field device.

In another example embodiment, the characteristic of the near-field communications link is at least one of: a tuning parameter of a tuning circuit in the near-field device, data throughput in the near-field communications link, or a number of lost data packets in the near-field communications link.

In another example embodiment, the controller is configured to place the first near-field device in a low-power state if the characteristic is below both the first and second characteristic thresholds; and the controller is configured to take the first near-field device out of the low-power state if the characteristic is above either of the first and second characteristic thresholds.

In another example embodiment, the first near-field device includes a power controller coupled to the controller and coupled to a power source; power controller is configured to turn-off the first near-field device if the characteristic is below both the first and second characteristic thresholds; and the power controller is configured to turn-on the first near-field device if the characteristic is above either of the first and second characteristic thresholds.

In another example embodiment, the near-field communications link uses a single channel having a single carrier frequency.

In another example embodiment, the first near-field device further includes a front-end portion configured to translate controller communications into the near-field signals exchanged with the second near-field device; the front-end portion includes, a near-field antenna having a first conductive surface and a second conductive surface; the conductive surfaces are configured to carry non-propagating quasi-static near-field electric-induction (NFEI) signals exchanged within the near-field communications link; and a tuning circuit coupled to the near-field antenna and having a set of tuning parameters and configured to adjust a resonant frequency and bandwidth of the near-field antenna.

In another example embodiment, the first near-field device further includes a front-end portion configured to translate controller communications into the near-field signals exchanged with the second near-field device; and the front-end portion includes, a near-field antenna having a coil; wherein the coil is configured to carry non-propagating quasi-static near-field magnetic-induction (NFMI) signals exchanged within the near-field communications link; and a tuning circuit coupled to the near-field antenna and having a set of tuning parameters and configured to adjust a resonant frequency and bandwidth of the near-field antenna.

In another example embodiment, the user is at least one of: a robot, a vehicle, a docking system, a physical coupling system, a ticketing station, a security portal, and/or an assembly line device.

In another example embodiment, the near-field device is embedded in at least one of: a vehicle, a game controller, an amusement park ride, a medical device, an industrial station, or a robotic device.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless devices communications are known for a flexibility they provide to users in a variety of environments. Wireless devices using near-field communications are particularly useful when a limited communication range is desired/required since they do not create much far field energy that can disturb other systems or be undesirably detected. Such near-field devices are well suited for communication near a human body since such near-fields couple to the body.

However, all wireless communications can experience link drop-outs, attenuation, fading, shadowing etc. resulting in not only missed data transfers, but also consuming limited resources of both a transmitter and receiver.

Far-field approaches to addressing such interruptions can include channel hopping and generating channel availability lists. For example, channel hopping techniques detect loss of wireless synchronization on an initial wireless channel, obtains a measure of quality for the initial wireless channel, and then selects a new wireless channel when the obtained measure of quality fails to satisfy a threshold criteria. Alternatively, ordered availability lists of available wireless channels are generated in accordance with a quality measure of the wireless channels. Thus, when quality degradation associated with a first wireless channel is detected, the ordered list can be updated to indicate a lower preference for a wireless channel subject to attenuation and/or interference, and a higher preference for a second wireless channel that does not suffer from quality degradation. These techniques all relate to abandoning channels that do not have a required quality.

Now discussed are near-field based wireless devices that analyze variable near-field communications link characteristics (e.g. channel behavior, packet error rate (PER), received signal strength (RSS), etc.) between a set of near-field devices in a WBAN (Wireless Body Area Network) and present a robust circuit and/or method for optimizing communications link data throughput while minimizing power consumption.

Near-field communications link characteristics within a WBAN can vary for many reasons, including changes in an environmental noise level and/or when the devices are moving with respect to each other (e.g. either between two or more on-body devices, or one or more on-body and off-body devices). Near-field transmissions are then modulated based on these monitored characteristics. Such near-field devices to be discussed can also maintain (e.g. not abandon) their current channel (e.g. frequency/bandwidth).

Power savings for example can be achieved by not transmitting near-field signals when there is an actual or predicted drop in a near-field communications link characteristic below a characteristic threshold level, thereby eliminating retransmissions. Another advantage includes near-field device resource savings (e.g. processing cycles) such that the near-field device can engage in other tasks during the link drop time.

Figure 1:
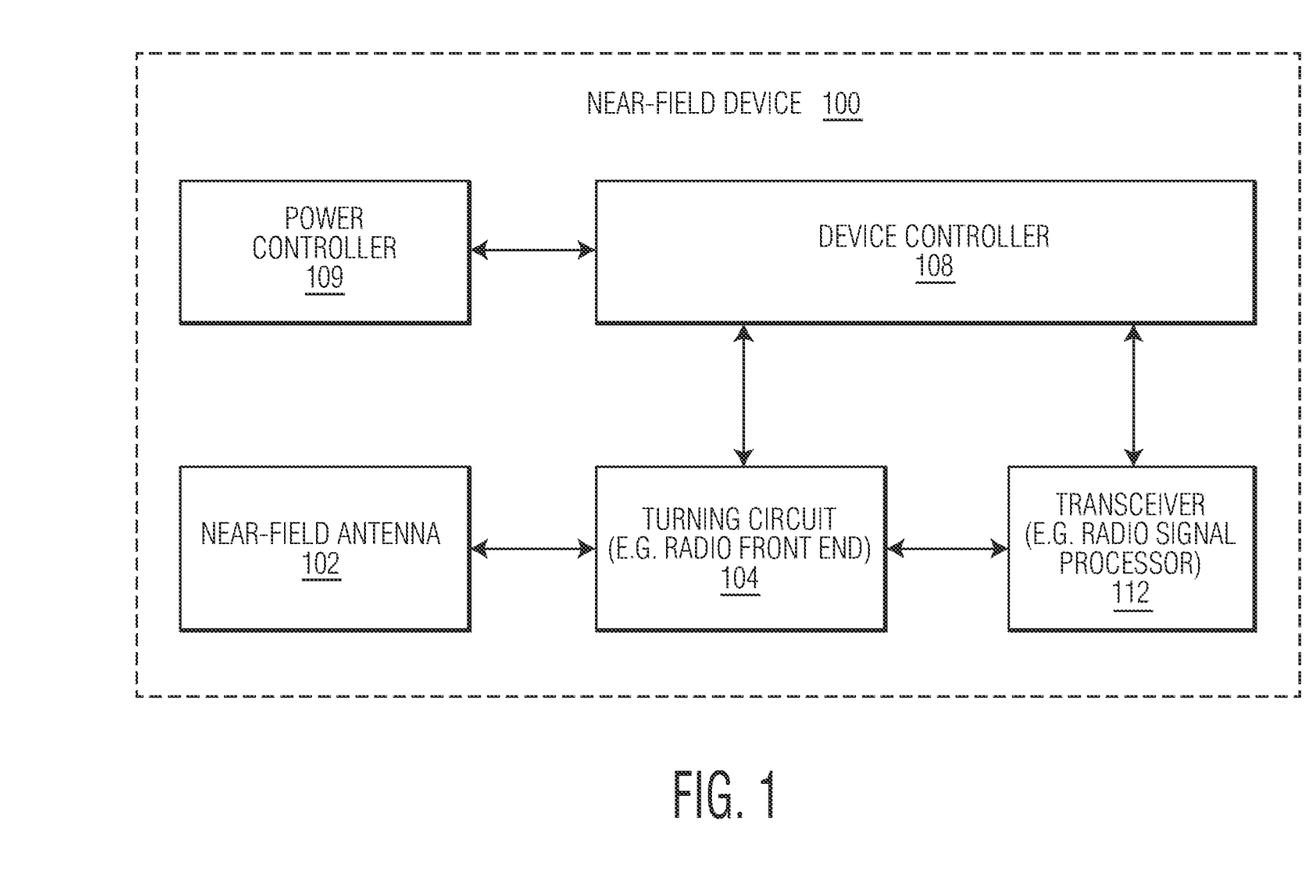
FIG. 1 is an example of a near-field device.

In some example embodiments the device 100 uses a digital modulation encoding scheme (e.g. having a modulation order of at least two) and where data is transmitted by means of organized packets. Such digital data would be modulated and transmitted based on (e.g. synchronized with) a dynamic body channel characteristic of a user wearing the device 100 so as to provide lowest possible packet error rate (PER) and reduced power consumption.

The near-field interactions between one or more near-field devices discussed herein can involve either on-body and/or off-body near-field devices. On-body devices are those near-field devices on a user's body or the body of a conductive surface. Off-body devices are defined with reference to the on-body devices and include any other near-field device that is not on-body as defined earlier.

These near-field devices can be based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

In various example embodiments, a first near-field antenna includes a near-field electric-induction antenna (e.g. such as either a NFEI or NFEMI antenna) and is configured for on-body communications. A second near-field antenna includes a near-field magnetic-induction antenna (e.g. such as an NFC antenna) and is configured for off-body communications.

For example, an on-body sensor in a first near-field wireless device can be configured to communicate the sensor's readings to a second on-body near-field wireless device that collects the sensor's readings and perhaps other user information as well. A third off-body wireless device could be a smartphone/NFC reader that energizes the second on-body near-field wireless device that collected the sensor's readings, and thereby prompts the second on-body near-field wireless device to transmit the collected the sensor's readings to the smartphone/NFC reader.

Note, while example embodiments discussed herein refer to a user's body, on-body and off-body, body is herein broadly defined to include at least: a human's body, an animal's body, a body of a living organism, a body structure of an inanimate object, a robot, a vehicle, a docking system, a physical coupling system, a station on an assembly line, and so on.

In a near-field device, an H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

Also in a near-field device, an E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

FIG. 1 is an example of a near-field wireless device 100. The example near-field wireless device 100 includes a near-field antenna 102, a tuning circuit 104 (e.g. radio front end), a device controller 108, power controller 109, and a transceiver circuit 112 (e.g. radio signal processor). An example of the near-field antenna 102 is presented and discussed in FIGS. 2A and 2B.

The tuning circuit 104 is configured to adjust the device's 100 resonance frequency using a capacitive bank (C-bank), and bandwidth using a resistive bank (R-bank) in response to signals from the transceiver circuit 112 and the device controller 108. The C-bank and R-bank discretes are in some examples about 130 pF and 5000 ohms respectively to support the required resonance frequency (e.g. 10.6 MHz) and bandwidth (e.g. 400 KHz). The device controller 108 is configured to adjust (e.g. increment/decrement) the C-bank and R-bank values using the tuning circuit 104.

The device controller 108 is configured to monitor and maintain the device's 100 operational resonance frequency and operational bandwidth/quality factor of the near-field signals (e.g. NFEI or NFEMI) carried by the near-field antenna. The device controller 108 is configured to adjust tuning parameters in the tuning circuit 104 if either the operational resonance frequency is different from a preselected resonance frequency and/or the operational bandwidth is different from a preselected bandwidth.

The device controller 108 is also configured to monitor one or more near-field communications link characteristics (e.g. RSS (Received Signal Strength). While the near-field communications link characteristic of RSS is discussed herein, RSS is only one example of a near-field communications link characteristic. Other near-field communications link characteristics include: a tuning parameter of the tuning circuit 104, data throughput in the near-field communications link, or a number of lost data packets in the near-field communications link.

In some example embodiments, the controller 108 is configured to select a first modulation encoding for transmitting a near-field signal if the characteristic is greater than a first characteristic threshold; select a second modulation encoding for transmitting the near-field signal if the characteristic is less than the first characteristic threshold but greater than a second characteristic threshold; and to delay transmission of the near-field signal to the second near-field device if the characteristic is below both the first and second modulation encodings. All this can be accomplished using a single channel having a single near-field carrier frequency.

In some example embodiments, the first characteristic threshold is greater than the second characteristic threshold and the first modulation encoding has a greater number modulation-states (e.g. a greater maximum theoretical data-rate) than the second modulation encoding.

In some example embodiments, the modulation encoding is a modulation order having two or more modulation-states. Modulation Order (MO) is herein defined as a number of different signal states (e.g. symbols) possible in each near-field signal transmission. For example, an MO=2 defines a two-state (e.g. binary shift keying (BSK)) communication signal (e.g. 0, 1 or −1, 1 or etc.). An MO=4 is a quadrature phase shift keying (QPSK) communications signal. An MO=m is an m-state communications signal, where m=any integer number (e.g. 2, 4, 8, 16, etc.). Higher MOs can achieve a higher data-rate by encoding each signal state as a greater equivalent number of bits (e.g. QPSK has 4 phase states with 2 bits/symbol, and BPSK and DPSK have 2 phase states with 1 bits/symbol).

An optimal MO depends upon a transmit power, receive sensitivity, and/or a noise floor for the communications channel. For communications channels with a lower SNR (signal to noise ratio), a lower MO is typically selected in order to keep a packet error rate (PER) below a predetermined PER threshold (e.g. <10%).

In some example embodiments, the controller 108 is configured to incrementally increase the modulation order as the characteristic increases, and incrementally decrease the modulation order as the characteristic decreases. Also the controller 108 can be configured to transmit a first part of a near-field signal using the first modulation encoding when the characteristic is greater than the first characteristic threshold, transmit a second part of the near-field signal using the second modulation encoding when the characteristic is less than the first characteristic threshold, and delay transmission of a third part of the near-field signal when the characteristic is lower than both the first and second characteristic thresholds.

For example, an initial default modulation order can be QPSK, but when the characteristic (e.g. RSS) drops below 40 dBμV, then a controller 108 can reduce the modulation order to BPSK. Thus the controller 108 is configured to select a modulation protocol/order for transmission based on the near-field communication channel's RSS.

The device controller 108 can also be configured to identify near-field communications link breakage and recovery time patterns in response to one or more user's behavior (e.g. movements), internal attributes (e.g. biological characteristics), and/or external attributes (e.g. ambient noise environment). This technique is herein defined as User Profile Driven Channel Access (UPDCA).

These near-field communications link characteristics, which may or may not have a periodicity, are then used to predict when a near-field communications link between a set of the near-field devices 100 will break and for how long so that the near-field device 100 conserves resources (e.g. power, processing, etc.) until the near-field communication link can be re-established. The identified near-field communications link characteristics can be stored in at least one of the near-field device's 100 memory.

In some example embodiments, at start-up (e.g. near-field device 100 initialization) the user connects two (or more) devices 100 onto their body (i.e. on-body) and performs a number of predefined movements and gestures (e.g. for 30 seconds). These movements can be instructed using a display on the near-field device 100 in some example embodiments, while in others the user can just begin a set of organic movements that near-field device 100 will automatically begin to identify and characterize, perhaps using an artificial intelligence (AI) algorithm. These near-field communications link characteristic variations based on these movements are then logged.

These characteristics can form an initial training data set of which is stored in the memory. This training set of near-field communications link characteristics can then be continuously adapted as the user continues to engage in the identified activity. In some example embodiments, there is no training period, and instead near-field communications link characterization is built in real-time based on successful and unsuccessful near-field signal communications (e.g. initially, or periodically, using acknowledgement signals to verify receipt of a data packet).

The controller 108 can be configured to: define a transmission window as a time period when the characteristic is above either one of the characteristic thresholds; extract a set of features from the near-field communications link characteristic within the transmission window; wherein at least one of the features is a trigger feature found at a beginning of the transmission window; and then the controller 108 is configured to logically equate the trigger feature with a beginning of a specific user movement.

These specific user movements can include: walking, moving arms, moving head, moving fingers, bending, stretching, jumping, swimming, rotating, swinging, holding a posture, meditating, or moving in relation to another user.

In some example embodiments, the controller 108 is configured to instruct the user to perform one or more of these specific user movements; and then the controller 108 can verify that the specific user movements have been performed by monitoring the characteristic for the previously identified trigger feature.

The device controller 108 can be configured to delay near-field signal transmission until either of the first and second characteristic thresholds are again reached. Such a delay can reduce power and resource consumption of the near-field devices 100 thereby enabling batteries in some example near-field devices 100 to last much longer, and or the near-field device 100 to complete other processing and/or computational tasks.

For example, the power controller 109 can be configured to place the near-field device 100 into a standby, low-power, hibernation, off, different mode, etc. state in response to a signal from the device processor 108 during times when near-field communications would be below both the first and second characteristic thresholds. Thus, prior and/or real-time knowledge of such near-field communications link characteristics can be used to enable near-field communications in a more power-efficient way that can be particularly important for on-body devices 100 powered by batteries.

The device controller 108 can in some examples instruct at least one of the near-field devices 100 to transmit a polling signal as a first step toward re-establishing a near-field communications link between one or more pair of near-field devices 100.

In one example embodiment, an RSS near-field communications link characteristic threshold is set to 40 dBuV to account for possible external/ambient random interference, such that the near-field devices 100 do not attempt to exchange data packets until after the RSS characteristic is above the threshold.

In some example embodiments, the device controller 108 defines a near-field transmission window (e.g. ON-time) when the RSS is above the threshold and a wait/standby window (e.g. OFF time) when the RSS is below the threshold given. For example, the first user can have an ON-time of 630 ms and an OFF time of 1020 ms, and the second user can have an ON-time of 150 ms and an OFF time of 950 ms.

In some example embodiments, the controller 108 prepares a set of data packets for transmission according to a quality of service requirement. The controller 108 selects a set of modulation orders such that other near-field devices will receive the set of data packets as required by the quality of service requirement.

Note, while example embodiments discussed herein refer to a "user", in alternate embodiments the near-field device 100 can be taken exclusive possession of by other items, entities, etc. such as by: a robot, a vehicle, a docking system, a physical coupling system, a station on an assembly line, and so on.

Figure 2A:
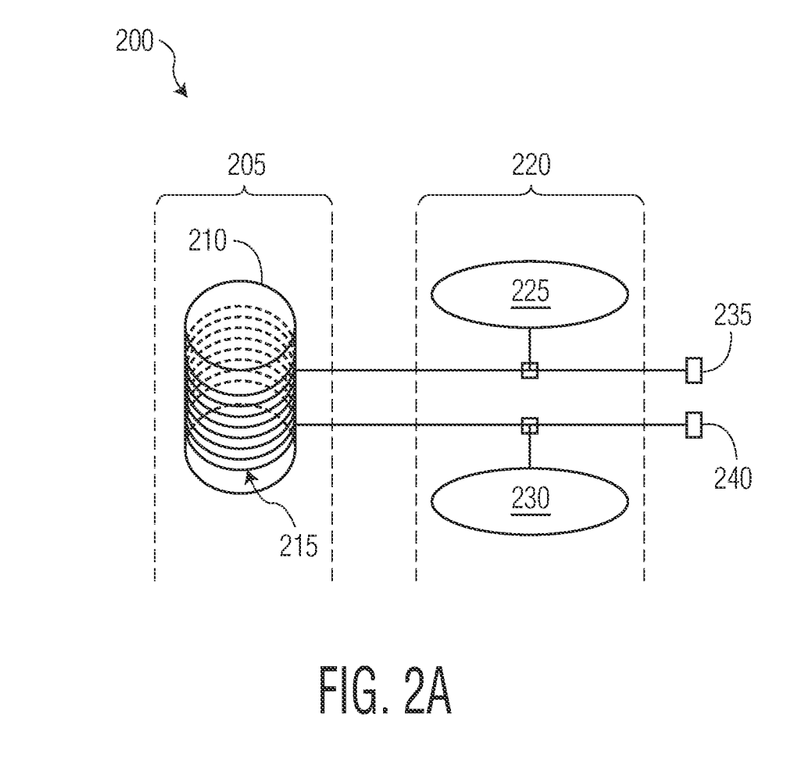
FIG. 2A is a first example near-field antenna in the wireless device.

FIG. 2A is a first example 200 near-field antenna in the wireless device 100. In this example the antenna 200 is a near-field electromagnetic induction (NFEMI) antenna. In some example embodiments, the antenna 200 includes a coil (H-field) antenna 205 for magnetic fields, in conjunction with a short loaded dipole (E-field) antenna 220 for electric fields. The H-field antenna 205 includes a ferrite core 210 wound with wire 215. The E-field antenna 220 includes two conductive loading surfaces 225 and 230. Antenna 200 feed points 235, 240 are coupled to various transceiver circuitry, such as a downstream radio transmitter and receiver integrated circuit (RF-IC), (not shown here). The antenna 200 can be tuned to resonate at a communication frequency by means of reactance components that are integrated in the RF-IC. The antenna's 200 bandwidth can similarly be tuned using the reactance components.

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

Figure 2B:
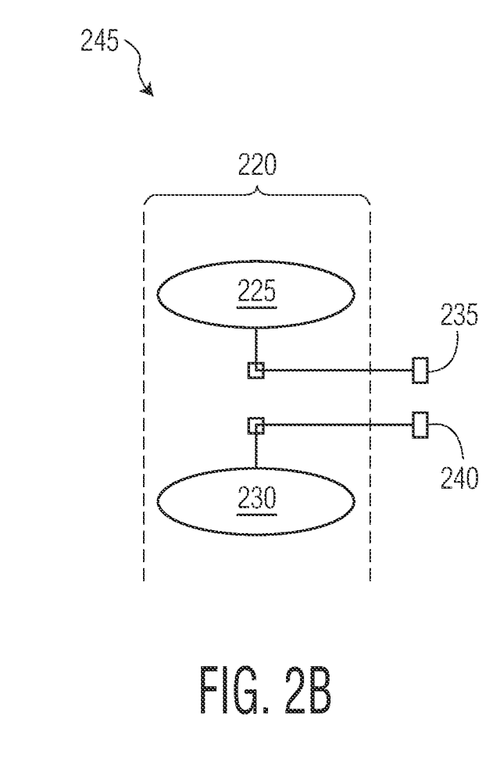
FIG. 2B is a second example near-field antenna in the wireless device.

FIG. 2B is a second example 245 near-field (e.g. near-field electro induction (NFEI)) antenna in the wireless device 100. The second example near-field antenna 245 consists of just the short loaded dipole (E-field) antenna 220 portion of the first example near-field antenna 200.

Figure 3A:
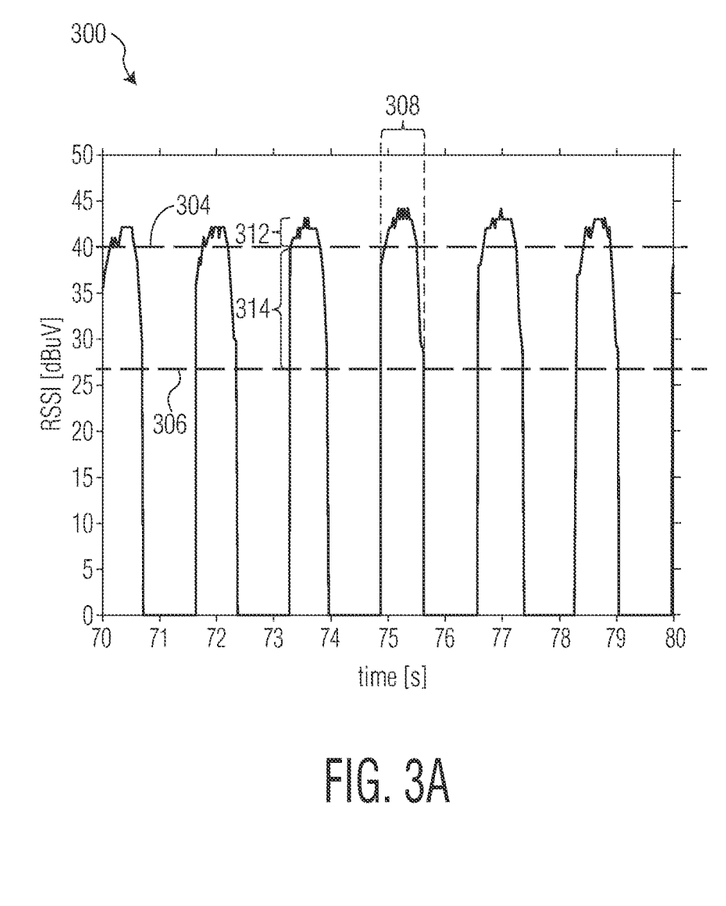
FIGS. 3A and 3B are example graphs of two different users having different near-field communications link characteristics even when wearing an identical set of near-field devices.
Figure 3B:
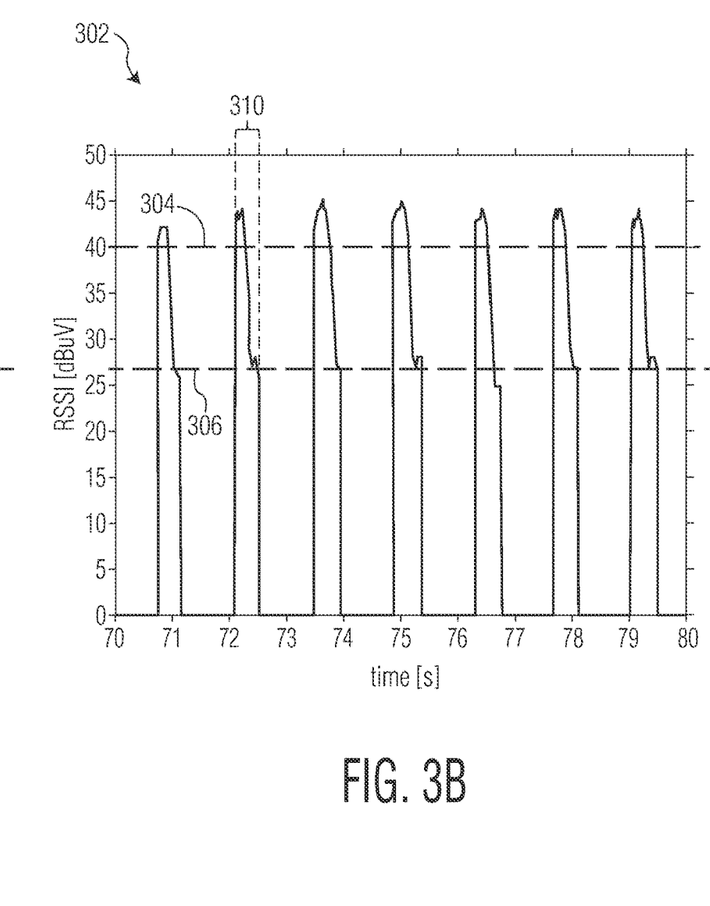

FIGS. 3A and 3B are example graphs of two different users having different near-field communications link characteristics 300, 302 even when wearing an identical set of near-field devices 100. These example characteristics 300, 302 show a received voltage in dBµV when the users are walking for an application with an operating frequency F=10.6 MHz for a bandwidth of 450 KHz and a transmitted voltage of 132 dBµV.

FIG. 3A is an example graph 300 of a Received Signal Strength RSS [dBµV] between a first pair of near-field devices 100 coupled to a first user while walking. FIG. 3B is an example graph 302 of a RSS between a second pair of near-field devices 100 coupled to a second user also while walking faster or perhaps running. Each of the users wear a first device 100 at a left waist location and a second device 100 at a back side of their left lower leg. The RSS profile for the two users is unique to each user.

In some example embodiments, a first characteristic (e.g. RSS) threshold 304 is set by the device controller 108 to 40 dBµV to guarantee a packet error rate (PER)<10% even when there is external noise interference, and the second characteristic (e.g. RSS) threshold 306 is set by the device controller 108 to 28 dBµV to guarantee a packet error rate (PER)<10% assuming a noise free environment.

The monitored characteristic (e.g. RSS) has a periodic character that defines a duty cycle (i.e. ON-time). Using the second characteristic (e.g. RSS) threshold 306 of 28 dBµV, this results in a first near-field transmission window 308 (e.g. ON-time) for the first user, and a second near-field transmission window 310 (e.g. ON-time) for the second user.

For the first user in FIG. 3A and using the first characteristic (e.g. RSS) threshold 304 of 40 dBµV, this results in an ON-time of about 630 ms (e.g. duty cycle of about 40%). Additional thresholds can be defined depending upon a specific implementation/application of the device 100.

Such duty cycle may vary as the user moves, accelerates, and/or decelerates. Other body movements (e.g. a user's limb movement) may exhibit a non-periodic monitored characteristic, having a different ON-time. In some example embodiments, the ON-time is herein defined as an absolute time per each RSS cycle/period that RSS of the received signal is above either the first or second thresholds 304, 306.

When the characteristic (e.g. RSS) is above the first characteristic threshold 304 (40 dBµV), the controller 108 can modulate the near-field signal to be transmitted using either the first modulation encoding 312 or the second modulation encoding 314 and thereby ensure a PER<a PER threshold (e.g. 10%). This is equivalent to a first ON-time region.

When the characteristic (e.g. RSS) is below the first characteristic threshold 304 (40 dBµV) but still above the second characteristic threshold 306 (28 dBµV), the controller 108 can modulate the near-field signal to be transmitted using just the second modulation encoding 314 to ensure a PER<the PER threshold (e.g. 10%). This is equivalent to a second ON-time region.

However when the characteristic (e.g. RSS) is below both the first characteristic threshold 304 (40 dBµV) and the second characteristic threshold 306 (28 dBµV), the controller 108 delays transmission of the near-field signal since a PER<the PER threshold (e.g. 10%) cannot be ensured.

Thus in some example embodiments, near-field signal data packet transfer is allowed when the RSS (determined by the dynamic body channel loss) is sufficient to ensure a PER<10%. However, near-field signal data packet transfer is blocked when the dynamic body channel exhibits a higher loss (e.g. RSS below both the first and second thresholds 304, 306).

Figure 4A:
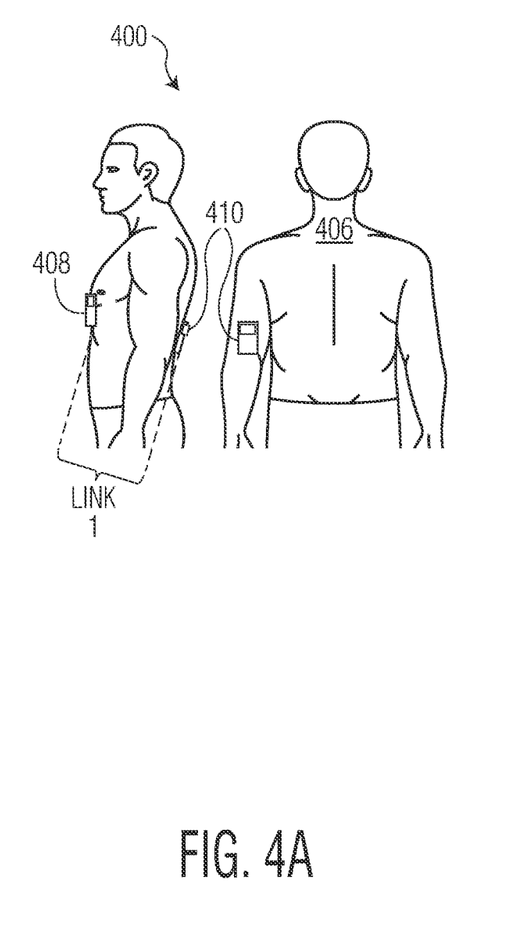
FIGS. 4A, 4B and 4C are example pictorial positionings of a pair of the near-field devices.
Figure 4B:
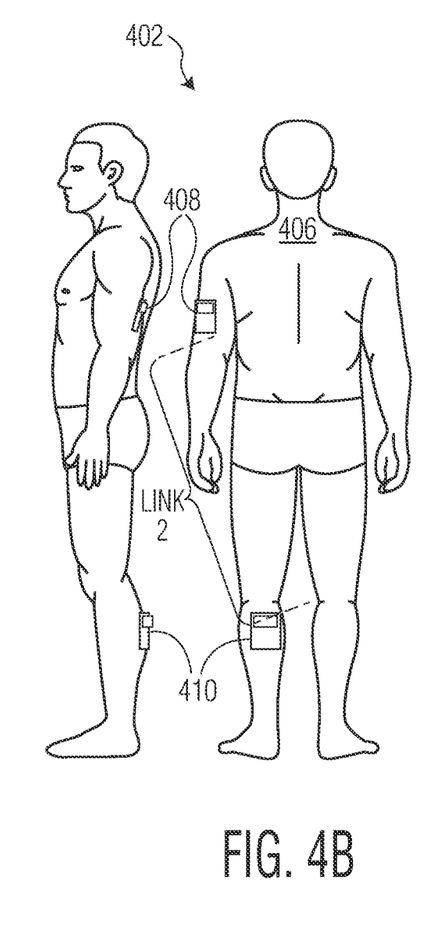
Figure 4C:
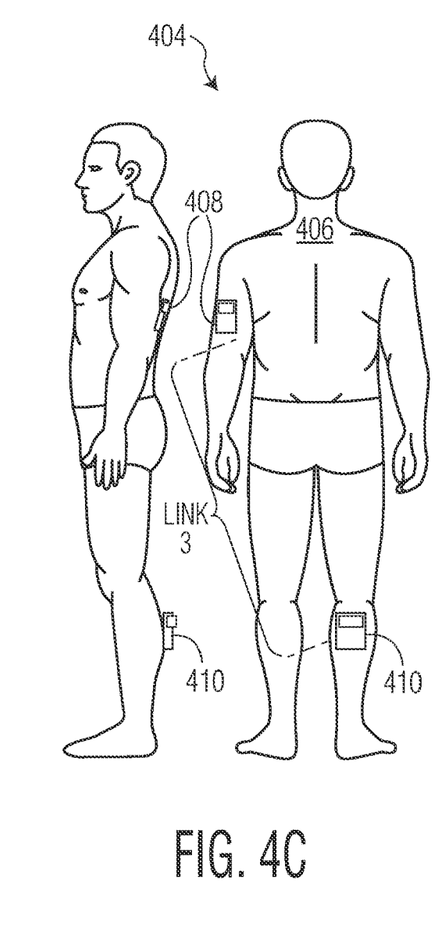

FIGS. 4A, 4B and 4C are example pictorial positionings 400, 402, 404 of a pair of the near-field devices 100.

Example 400 shows a user 406 having a first near-field device 408 positioned at a central chest location and a second near-field device 410 positioned at a back side of a left upper arm. This configuration creates a first near-field communications link (e.g. link 1).

Example 402 shows the user 406 having the first near-field device 408 positioned at a back side of a left upper arm and the second near-field device 410 positioned at the back side of a left lower leg. This configuration creates a second near-field communications link (e.g. link 2).

Example 404 shows the user 406 having the first near-field device 408 positioned at the back side of the left upper arm and the second near-field device 410 positioned at a back side of a right lower leg. This configuration creates a third near-field communications link (e.g. link 3).

The device controller 108 in at least one of the devices 100 creates User Profile Driven Channel Access (UPDCA) models for each of these example positionings 400, 402, 404 as discussed above. In some example embodiments, a single pair of devices 100 store in memory UPDCA data for each of the example positionings 400, 402, 404 so that a single user 406 may reposition the devices 100 without needing to retrain the UPDCA models each time the device's 100 positions are switched.

Figure 5:
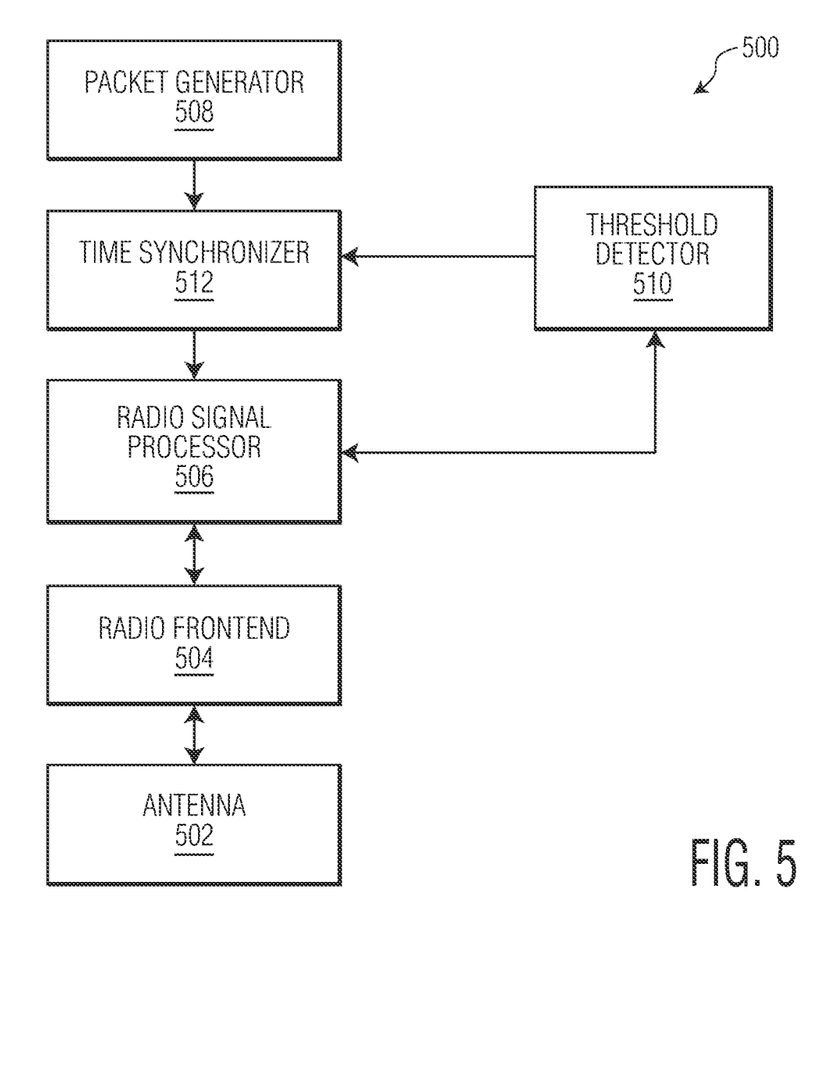
FIG. 5 is another example of the near-field device.

FIG. 5 is another example 500 of the near-field device 100. Here a near-field antenna 502 is connected to a radio frontend 504 containing an antenna tuning unit (ATU), a reception low noise amplifier (LNA), and a transmission power amplifier (PA). The radio frontend 504 is connected to a radio signal processor 506 that receives and transmits data packets using near-field signals.

The data packets are prepared by a packet generator 508. A threshold detector 510 monitors a received signal strength (RSS) of the near-field signal from the radio signal processor 506. The threshold detector 510 determines when the received signal strength is above a specified threshold and will drive a time synchronizer 512 accordingly. The threshold detector 510 will determine a ON-time of the dynamic channel characteristic. The time synchronizer 512 will allow packets to be sent during the ON-time when the received signal strength is above an RSS threshold that would yield a PER<10%. If the threshold cannot be achieved, data transfer is blocked and no packets are sent.

A first ON-time window, if the monitored RSS is above a higher RSS threshold, uses a default modulation having a higher modulation order. Successive ON-time windows can be defined if the monitored RSS is below the higher RSS threshold but above a successive set of lower RSS thresholds using lower modulation orders.

Should the monitored RSS fall below a lowest RSS threshold and then recover above the lowest RSS threshold, communications link re-establishment can be incremental with slowly increasing modulation orders as the RSS improves.

In some example embodiments, at start-up, a first training data set of monitored RSS signals for a particular user are recorded. This training set can be continuously adapted with additional monitored RSS values available under normal operation as a continual learning mechanism. A link timing definer (i.e. time synchronizer 512) and modulation scheme definer (e.g. within the radio signal processor 506) together derive a time sequence for different modulation orders based on the varying RSS profile in the training data set.

The threshold detector 510 continually checks if a current SNR from the monitored RSS signal is sufficient for the highest default modulation. If not, the radio signal processor 506 will then adapt the modulation scheme accordingly for the current time interval. Thus data throughput can be varied based on the RSS signal.

This example device 500 provides an optimal way to transfer data packets with a lower packet error rate, such as required for medical applications like near-field device supported glucose monitoring and administration.

Example applications of the near-field device 100 include various wireless on-body networks that require a small form factor. Medical applications, for example glucose monitoring system that is worn on-body. A glucose sensor measures the glucose level in the blood at some position on the body and transfers this value with near fields to the insulin pump also worn on-body or in close proximity to the body. Other applications include: a robot (e.g. collaborative), a vehicle (e.g. V2X navigation), a docking system, a physical coupling system, a ticketing station, a security portal, and/or an assembly line device.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A first near-field device, comprising:
a controller configured to establish a near-field communications link with a second near-field device;
wherein the controller is configured to monitor a characteristic of the near-field communications link;
wherein the controller is configured to select a first modulation encoding for transmitting a near-field signal when the characteristic is greater than a first characteristic threshold; and
wherein the controller is configured to select a second modulation encoding for transmitting the near-field signal when the characteristic is less than the first characteristic threshold but greater than a second characteristic threshold; and
wherein the controller is configured,
to transmit a first set of data packets using the first modulation encoding when the characteristic is greater than the first characteristic threshold;
to transmit a second set of data packets using the second modulation encoding when the characteristic is less than the first characteristic threshold; and
to delay transmission of a third set of data packets when the characteristic is lower than both the first and second characteristic thresholds; and
to resume transmission of the third set of data packets when the characteristic is above either the first or second characteristic thresholds.

2. The device of claim 1:
wherein the controller is configured to temporarily block transmission of the third set of data packets to the second near-field device when the characteristic is below both the first and second modulation encodings.

3. The device of claim 1:
wherein the first modulation encoding has a greater number modulation-states than the second modulation encoding.

4. The device of claim 1:
wherein both the first and second characteristic thresholds correspond to a packet error rate (PER) less than a single PER threshold.

5. The device of claim 1:
wherein the first modulation encoding has a greater maximum theoretical data-rate than the second modulation encoding.

6. The device of claim 1:
wherein the first and second modulation encoding have a modulation order including two or more modulation-states.

7. The device of claim 6:
wherein the controller is configured to incrementally increase the modulation order as the characteristic increases, and incrementally decrease the modulation order as the characteristic decreases.

8. The device of claim 1:
wherein the first or second modulation encoding is at least one of: BSK, BPSK, DPSK, or QPSK.

9. The device of claim 1:
wherein, in response to preparing a set of data packets according to a quality of service, the controller is configured to select a set of modulation orders such that the second device would receive the set of data packets as required by the quality of service.

10. The device of claim 1:
wherein the controller is configured to stop transmission of the third set of data packets and reduce power consumption of the device for a same time period each time the characteristic is less than both the first and second characteristic thresholds.

11. The device of claim 1:
wherein the controller is configured to define a transmission window as a time period when the characteristic is above either one of the characteristic thresholds;
wherein the controller is configured to extract a set of features from the near-field communications link characteristic within the transmission window;
wherein at least one of the features is a trigger feature found at a beginning of the transmission window; and
wherein the controller is configured to logically equate the trigger feature with a beginning of a specific user movement.

12. The device of claim 11:
wherein the specific user movement is at least one of: walking, moving arms, moving head, moving fingers, bending, stretching, jumping, swimming, rotating, swinging, holding a posture, meditating, or moving in relation to another user.

13. The device of claim 11:
wherein the controller is configured to instruct the user to perform the specific user movement; and
to verify that the specific user movement has been performed by monitoring the characteristic for the trigger feature.

14. The device of claim 1:
wherein the characteristic of the near-field communications link is a received signal strength (RSS) from a second near-field device.

15. The device of claim 1:
wherein the characteristic of the near-field communications link is at least one of: a tuning parameter of a tuning circuit in the near-field device, data throughput in the near-field communications link, or a number of lost data packets in the near-field communications link.

16. The device of claim 1:
wherein the controller is configured to place the first near-field device in a low-power state when the characteristic is below both the first and second characteristic thresholds; and
wherein the controller is configured to take the first near-field device out of the low-power state when the characteristic is above either of the first and second characteristic thresholds.

17. The device of claim 1:
wherein the first near-field device includes a power controller coupled to the controller and coupled to a power source;
wherein power controller is configured to turn-off the first near-field device when the characteristic is below both the first and second characteristic thresholds; and
wherein the power controller is configured to turn-on the first near-field device when the characteristic is above either of the first and second characteristic thresholds.

18. The device of claim 1:
wherein the near-field communications link uses a single channel having a single carrier frequency.

19. The device of claim 1:
wherein the first near-field device further includes a front-end portion configured to translate controller communications into the near-field signals exchanged with the second near-field device; and
wherein the front-end portion includes,
a near-field antenna having a first conductive surface and a second conductive surface;
wherein the conductive surfaces are configured to carry non-propagating quasi-static near-field electric-induction (NFEI) signals exchanged within the near-field communications link; and
a tuning circuit coupled to the near-field antenna and having a set of tuning parameters and configured to adjust a resonant frequency and bandwidth of the near-field antenna.

20. The device of claim 1:
wherein the first near-field device further includes a front-end portion configured to translate controller communications into the near-field signals exchanged with the second near-field device; and
wherein the front-end portion includes,
a near-field antenna having a coil;
wherein the coil is configured to carry non-propagating quasi-static near-field magnetic-induction (NFMI) signals exchanged within the near-field communications link; and
a tuning circuit coupled to the near-field antenna and having a set of tuning parameters and configured to adjust a resonant frequency and bandwidth of the near-field antenna.

21. The device of claim 1:
wherein the user is at least one of: a robot, a vehicle, a docking system, a physical coupling system, a ticketing station, a security portal, and/or an assembly line device.

22. The device of claim 1:
wherein the near-field device is embedded in at least one of: a vehicle, a game controller, an amusement park ride, a medical device, an industrial station, or a robotic device.

* * * * *